May 2, 1972     F. W. TOBER     3,660,281

PERMEATION SEPARATION MEMBRANES

Filed May 6, 1970

INVENTOR
FRANK WILLIAM TOBER

BY *Larry A. Samuels*

ATTORNEY

United States Patent Office 3,660,281
Patented May 2, 1972

3,660,281
PERMEATION SEPARATION MEMBRANES
Frank William Tober, Wilmington, Del., assignor to E. I.
du Pont de Nemours and Company, Wilmington, Del.
Filed May 6, 1970, Ser. No. 34,948
Int. Cl. B01d *13/00*
U.S. Cl. 210—23                                    11 Claims

ABSTRACT OF THE DISCLOSURE

A membrane for the selective permeation separation of aqueous mixtures, which is a thin film or hollow filament of a linear aliphatic polyamide resin containing a hydrolyzable tannin.

BACKGROUND OF THE INVENTION (1) Field of the invention

This invention is concerned with improved semipermeable membranes for the separation of components of aqueous compositions. More specifically, the invention is directed to such membranes as are prepared by treating a pre-prepared aliphatic polyamide resin membrane with a hydrolyzable tannin.

(2) Description of the prior art

The process of reverse osmosis has long been attractive for the selective permeation separation of aqueous mixtures containing impurities, e.g., brackish water or sea water. Reverse osmosis is attractive because of the relatively small amounts of energy required to accomplish the desalination of water or the ultrafiltration of aqueous materials containing differing molecular weight or particle size impurities.

In recent years improved membranes and apparatus have become available for use in the reverse osmosis process. Of interest are permeation separatory devices (called permeators) in which a multitude of long, thin, permeable hollow fiber or filament membranes are disposed inside a cylindrical jacket such as is shown in Mahon U.S. Pat. 3,228,877 in which the filaments extend the length of the jacket. Aqueous feed mixture to be separated is admitted to the jacket interior under pressure where the component to be separated passes through the walls of the hollow filament membranes to their interior bore. The separated portion travels down the bore of the filament to a collecting vessel, while the remainder of the aqueous mixture still outside the filament is drawn off from the interior of the jacket through a jacket outlet port.

Another type of permeator is described in British Pat. 1,019,881. The permeator operates in the same manner as the Mahon permeator, but the configuration of the filaments in the jacket is different. The hollow filaments extend the length of the jacket and then are looped back so that both ends of each filament extend through the same end of the cylindrical jacket.

It has also been found that good separation results can be obtained with such permeators when the hollow filament membranes are prepared from linear aliphatic polyamide resins by casting and drawing them into hollow filament form. Such polyamides, particularly those useful in the jacketed permeator devices, are described in McLain et al. U.S. Pat. 3,423,491, Rosenbaum U.S. Pat. 3,472,766, and British Pat. 1,177,748. Of course, thin films of such resins can be employed in thin film separatory devices also.

However, it has been found that these aliphatic polyamide resin membranes deteriorate rapidly in separation usage and have a rather short useful life. It has been found that when such membranes are used to separate aqueous mixtures, they give good initial separation results but undergo a rapid increase in water flux (passage through the walls) and dissolved salt passage due to a decline in their physical properties, such as elongation at break and tenacity at break.

The present invention overcomes such rapid deterioration in these polyamide membrane properties by providing a process which comprises treating the polyamide membranes with a hydrolyzable tannin composition. The presence of an effective amount of hydrolyzable tannin in the membranes has been found to significantly lengthen the useful life of such membranes.

SUMMARY OF THE INVENTION

The composition of this invention comprises a membrane for the selective permeation separation of dissolved and colloidally dispersed materials in aqueous solutions or mixtures consisting essentially of a substantially linear aliphatic polyamide resin containing a hydrolyzable tannin in an amount effective to inhibit degradation of the resin from deterioration during use.

One process of this invention comprises treating a membrane for the selective permeation separation of dissolved and colloidally dispersed materials in aqueous solutions or mixtures consisting essentially of a substantially linear aliphatic polyamide resin, with an aqueous solution of a hydrolyzable tannin until the membrane contains sufficient tannin to inhibit degradation of the resin from deterioration.

Another process aspect of this invention comprises separating dissolved and colloidally dispersed materials in aqueous solutions or mixtures by subjecting such solutions or mixtures under pressure to one side of a permeation separation membrane defined as in the first paragraph of this summary of the invention.

BRIEF DESCRIPTION OF THE DRAWINGS

The invention may more readily be understood by reference to the drawings in which.

DESCRIPTION

Figure 1:
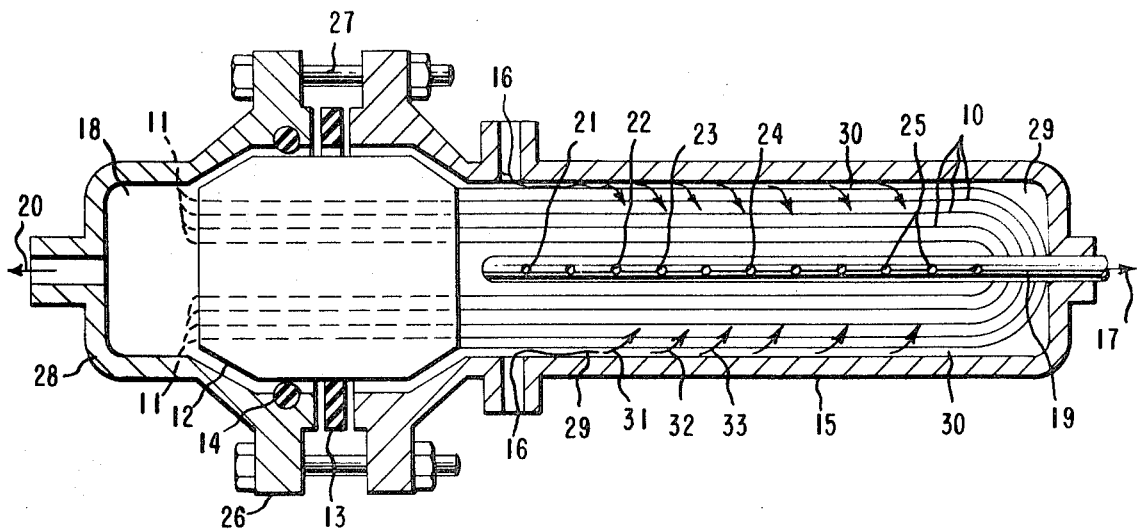
FIG. 1 depicts a cut-away view of the length of a permeator containing a multitude of long, thin hollow fibers.

The membranes that are treated with a hydrolyzable tannin are comprised essentially of a linear aliphatic polyamide resin. By the term "polyamide resin" is meant a polyamide polymer having a molecular weight of sufficient magnitude that it is fiber-forming and has a non-tacky surface at room temperature. High molecular-weight, fiber-forming polyamides of this type are known as nylons. By the term "substantially linear" is meant that the resin is comprised substantially of a straight chain in its chemical structure, but which may contain minor amounts of cross-linking and chain-branching structures provided its solubility and melt characteristics are not altered to any substantial extent. These resins are prepared by the polymerization of an aliphatic mono-amino carboxylic aliphatic acid or derivative thereof, such as a lactam, or by the condensation of an aliphatic diamine with an aliphatic dicarboxylic acid. Preferred resins are obtained by the polymerization of caprolactam (nylon 6) and by the condensation of hexamethylene diamine with adipic acid (nylon 66). Representative such resins are described in U.S. Pats. 2,071,253; 2,130,523; and 2,130,948. They can be structurally characterized by the recurring units

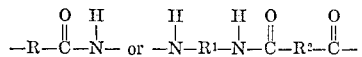

where R, $R^1$ and $R^2$ are divalent aliphatic groups of at least 2 carbon atoms. Preferably the divalent aliphatic groups are alkylene of two through eight carbon atoms. Up to about half of the amide hydrogen atoms can be replaced with alkyl or oxyalkyl groups of up to about four carbon atoms. These resins may be modified prior to or after formation of the membrane structure by irradiation grafting with polymerizable unsaturated organic acids as metal salts of such acids, or by reacting them with ethylene oxide as described in Hass et al. U.S. Pat. 2,835,653 and Rosenbaum U.S. Pat. 3,472,766.

The membranes formed from the substantially aliphatic polyamide resins can be of flat film or hollow filament form. They are generally from about 3 to 100 microns thick and are preferably about 5 to 50 microns thick. When in hollow filament form the filaments generally have outside diameters of 5 to 250 microns and wall thicknesses of 3 to 75 microns. Preferably they are hollow filaments with outside diameters of about 15 to 150 microns and wall thicknesses of about 5 to 40 microns. In general, these filaments with smaller outside diameters should have thinner walls so that the ratio of the cross-sectional area of the internal bore of the filament to the area enclosed by the outside wall of the filament is about 0.12 to 0.60. Preferably the ratio is about 0.18 to 0.45.

The membranes can be made in hollow filament form by the processes described by McLain et al. in U.S. Pat. 3,423,491. These processes involve melt spinning into a hollow filament shape an intimate mixture of the resin polymer and a plasticizer therefor at a temperature less than the boiling point of the plasticizer, cooling to obtain a shaped hollow filament element, and leaching with a solvent which is a solvent for the plasticizer and a nonsolvent for the polymer. Permeation separation membranes of such polyamide resins can also be made in flat film and hollow filament form by melt-pressing the resin into a thin film or melt-spinning it into a hollow filament as described by Burke et al. in U.S. Pat. 3,397,427 and treating the membrane so formed, as described in British Pat. 1,177,748, with a treating agent which dissolves a small amount of the membrane and otherwise changes its physical structure to increase its water permeability. Effective treating agents include protonic acids such as formic acid, Lewis acids such as borontrifluoride, and lyotropic salts such as calcium chloride. Aqueous formic acid is a preferred treating agent.

By selecting the proper types and amounts of solvents or treating agents, the porosity of the membrane can be controlled. Those membranes which are more suited for use in reverse osmosis processes are non-porous and relatively low in permeability for dissolved salts. Those membranes which are more suited for use in ultrafiltration processes may be more porous and can have higher permeabilities for dissolved salts but have low permeabilities for dissolved and dispersed organic materials of intermediate molecular weight and particle size.

The hydrolyzable tannins employed in the membranes of this invention are obtained by extracting leaves, twigs, bark, fruit and galls of trees and plants. By the term "hydrolyzable" is meant that they can be hydrolyzed with hydrolytic agents such as acids, alkali, hot water or enzymes to obtain gallic acid (such tannins are gallotannins) or ellagic acid (such tannins are ellagitannins). Tannins are common, well known compositions and are discussed extensively in "Chemistry of Vegetable Tannins" by Haslam, Academic Press, London, 1966, pp. 91–125. Particular hydrolyzable tannins are usually identified from the source (tree or plant) of extraction, as, for example, chinese gall (tannic acid), mimosa tannins, quebracho tannins, wattle tannins, chestnut tannins, eucalyptus tannins, tea extract tannins, and the like.

In general, tannins can be structurally characterized as a hydrolyzable mixture of complex polyphenolic substances having molecular weights in the range of 900–3000. In general, they are obtained by leaching leaves, bark and the like, with acetone and/or water, followed by extraction of the resulting solution with ethyl acetate, followed by evaporation of the ethyl acetate.

The preferred tannin for use in this invention is tannic acid. This tannin is obtained from the extraction of nut galls and is an amorphous powder occurring as glistening scales or spongy masses varying in color from yellow-white to light brown. Its properties are described in The Condensed Chemical Dictionary, Reinhold Publishing Corp., 7th edition.

The substantially linear aliphatic polyamide membranes prepared from the resins as described above are treated with the hydrolyzable tannin to obtain the membranes of the invention. The tannin can be included in the mixture of the resin and a plasticizer while melt-spinning the hollow filaments; however, a more convenient treating method is to treat the preformed membrane, whether hollow filament or thin film, with a solution of the hydrolyzable tannin. A preferred solvent is water but other solvents can be used, for example, acetone and aqueous alcohol.

The amount of tannin needed in the membrane to constitute an effective amount will, of course, vary depending on a number of factors. Ordinarily, one skilled in the art will wish to increase the useful life of the membrane to the greatest extent possible. The term "useful life" is, of course, a relative term which depends upon the degree of purity desired in the water passing through the membrane. In terms of an effective amount of tannin, discussed below, the phrase "useful life" will be referred to as that time of use of the membrane over which the concentration of the undesirable dissolved or dispersed material in the product effluent stream (the mixture passing through the membrane), increases by 25%. Thus, an effective amount can arbitrarily be defined as that amount of tannin which will result in at least a doubling of the time required for an increase by 25% in the concentration of dissolved or dispersed material in the mixture passing through the membrane.

Before further discussion of effective amounts of tannin, it is pointed out that the mechanism by which polyamide membranes are degraded in water is not understood, nor is the mechanism by which the hydrolyzable tannins retard such degradation understood. Observations indicate that the degradation may be of an oxidative free radical nature, probably catalyzed by trace amounts of active form of metal ions such iron, copper, chromium and nickel, and/or also of an oxidative nature where the polymer chains of the membrane are probably broken. The hydrolyzable tannins may react with the metal ion to modify their catalytic properties, although this theory has not been proven. Alternatively, the hydrolyzable tannins may react with free radicals and/or hydroperoxides to terminate reaction sequences otherwise causing degradation. Breakage of polymer chains in the membrane may account for the loss of tenacity and reduction of elongation at break in the degraded membranes. These phenomena are accompanied by an increase in passage of aqueous feed to be separated through the membrane.

The effective amount of a hydrolyzable tannin required to inhibit deterioration of the membrane thus cannot be predicted since it depends on a large numbers of variables, some of which are unknown and practically uncontrollable. For instance, assuming the unproven mechanisms outlined above for the deterioration, the amount of tannin required depends at least and amount other things upon the degree of inhibition of deterioration desired, upon the amount of dissolved oxygen in the aqueous feed media to be separated, upon the type, amount, and activity of any catalytic metals present, and upon the temperature at which the separation is carried out. The amount of dissolved oxygen in the feed mixture depends on the type and past history of the feed mixture and may range from fractional parts per million for natural ground waters to a few hundredths of a percent for industrial mixtures. It can be determined by well-known analytical procedures. The type, amount, and activity of dissolved catalytic metals present depends on the source and past exposure of the feed mixture as well as on the presence of other substances which modify the activity of the dissolved metals. These variables and others interact in unknown and unpredictable ways to influence the rate of degradation of any particular aliphatic polyamide permeation separation membranes.

Experience has shown that very small amounts of hydrolyzable tannins are effective for most purposes in retarding the degradation of the polyamide selective permeation separation membranes. As little as about 0.01 weight percent tannin in a polyamide membrane can be effective. As much as about 5 weight percent tannin may be desirable, but larger amounts of hydrolyzable tannin may reduce the water permeability of the membrane. A preferred amount is between about 0.05 weight percent and about 2.5 weight percent tannin based on the dry weight of polyamide in the membrane. The amount which is effective under any particular conditions can be determined readily by trial. The presence of hydrolyzable tannins in the polyamide membrane can be detected and amounts measured by standard qualitative and quantitive analysis techniques. Aqueous solutions of hydrolyzable tannins can be assayed by colorimetric measurements depending on the colors formed by the reduction of phosphotungstate and phosphomolybdate reagents by the tannins as described in Industrial and Engineering Chemistry (Analytical Edition) volume 14, pages 456–459 (1942).

The treating of the membrane with the tannin can be carried out by dipping the membrane in treating solution or by passing the treating solution over the surface of the membrane, either continuously or intermittently, until the membrane has adsorbed an effective amount of the tannin. Moreover, once the membrane is treated it can thereafter be treated by injecting small amounts of tannin continuously into the feed stream of the mixture to be separated so as to constantly maintain the amount of tannin present; or it can be injected into the feed stream intermittently in larger amounts at predetermined time intervals.

The concentration of hydrolyzable tannin in a treating solution can vary widely depending on the treating conditions. For example, a polyamide membrane can be protected from later degradation by dipping in a solution containing as little as 0.01 weight percent (100 parts per million) of a hydrolyzable tannin if sufficient solution and dipping time are allowed for absorption into the membrane of an effective amount of the tannin. Higher concentrations up to above 5.0 weight percent (50,000 parts per million) are also useful. Preferably a solution containing between about 0.05 and about 2.0 weight percent (500 and 20,000 parts per million) of tannic acid is preferred in such a dipping treating process. More dilute solutions are useful when the treatment involves the intermittent selective permeation separation of a solution containing a hydrolyzable tannin. Solutions containing between as little as about 0.001 to over 0.01 weight percent (10 parts to 1000 parts per million) can be used. Solutions containing between 0.002 to 0.004 weight percent (20 and 400 parts per million) of tannic acid are preferred. Still more dilute solutions are effective when the treatment involves the continuous selective permeation separation of the treating solution. Under such treating conditions isolutions containing as little as about 0.000005 weight percent (0.05 part per million) of a hydrolyzable tannin can be used. Solutions containing between about 0.0001 and about 0.002 weight percent (0.1 and 20 parts per million of tannic acid are preferred.

The linear aliphatic polyamide permeation separation membranes containing hydrolyzable tannins of this invention can be used for aqueous selective permeation separation processes such as reverse osmosis and ultrafiltration. In an aqueous reverse osmosis process water is forced from an aqueous solution through a membrane by a pressure greater than the osmotic pressure of the solution to obtain products containing reduced and increased proportions, respectively, of at least one component of the solution. The subject membranes are particularly useful for the reverse osmosis desalination of saline and brackish waters. In an aqueous ultrafiltration process water is forced by pressure from an aqueous mixture through a membrane to obtain products containing reduced and increased proportions of a dissolved or dispersed component which has a molecular or particle size such that the mixture has a relatively low osmotic pressure. Typical ultrafiltration processes include the isolation of virus and bacteria, fractionation of blood fluids and the concentration of alkaloids, glucosides, serums, hormones, vitamins, vaccines, aminoacids, antibiotics, fruits and vegetable juices, sugar solutions, milk liquids, extracts of coffee and other vegetable materials, and many other such systems.

Figure 2:
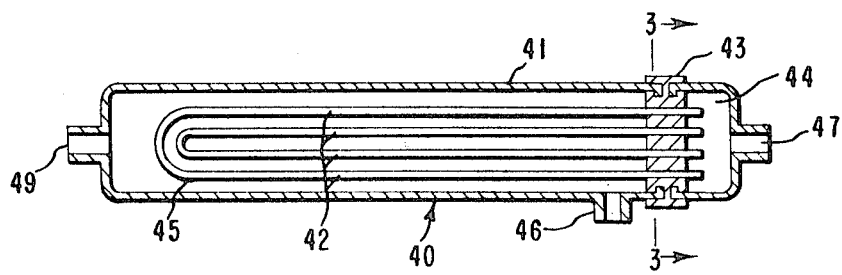
FIG. 2 depicts a cut-away view of another permeator similar to that of FIG. 1.
Figure 3:
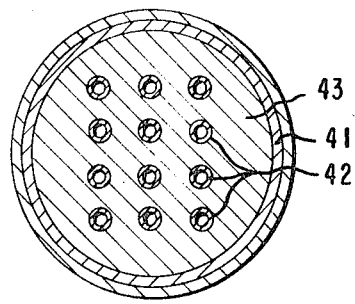
FIG. 3 is a cross-section of the permeator of FIG. 2 taken along line 3—3.

FIGS. 1 to 3 depicts two types of selective permeation separation apparatus which can be used to employ the membranes of this invention. FIG. 1 represent a permeator in which a hollow filament bundle containing a plurality of individual hollow filament selective permeation separation membranes of this invention 10 is positioned inside jacket 15. The filament membranes are surrounded by a porous sleeve 30. The filaments are looped at one end of the jacket so that both ends of each fiber extend through cast wall block 12 and open into chamber 18 at 11. Chamber 18 is formed by outer closure member 28 which is constructed to abut portions of the cast wall 12 and jacket 15 and is rigidly attached thereto by flanges 26 and bolts 27. Gasket seal 13 and O-ring 14 provide fluid tight seals. A feed mixture is introduced at 16 through jacket 15 under pressure and flows along annular ring space 29 between the outer filament bundle sleeve 30 and the interior wall of jacket 15. Once the annular space 29 is filled with feed mixture, the feed flows radially across the filament as represented by arrows (some of the filaments being denoted by 31, 32, and 33 toward exit perforations, some of which are denoted by 21, 22, 23, 24, and 25 along perforated exit tube 19. The rejected mixture (mixture remaining after the permeate mixture has passed through the filament walls) exits through these perforations and then to exit 17 where a pressure letdown device not shown allows it to leave the apparatus at atmospheric or other desired pressure. The mixture permeating through the filament walls passes through the hollow filament interiors and exits from the open fiber ends at 11 into chamber 18 and leaves the chamber at exit 20.

FIG. 2 shows a similar selective permeation separation apparatus 40 in which casing 41 contains hollow filament selective permeation separation membrane bundle 42 which extends through wall block 43 with the filaments of one end opening into the collecting chamber 44 and the other looped as at 45 so that both ends of each filament extend through the wall block 43. A feed mixture is introduced into the apparatus through feed inlet 46. The mixture which passes through the walls of hollow filaments 42 flows through the hollow interiors thereof into collection chamber 44 and is withdrawn through exit 47. Excess fluid not permeated is withdrawn through casing exit 49.

FIG. 3 illustrates a section through wall plug 43 of FIG. 2, showing the hollow ends of the individual filaments 42 (not to scale) extending through wall plug 43 mounted in casing 41. It will be understood that bundle 44 will usually contain a multiplicity of filaments.

In practicing this invention with the apparatus shown in FIGS. 1 and 2, the hollow filament membranes contain an amount of a hydrolyzable tannin which increases significantly the time required for significant changes in their selective permeation separation efficiency, as described herein. These membranes can be prepared by treating the membranes with a solution of the hydrolyzable tannin either by dipping the membranes in the solution before assembling the apparatus, by passing the solution through the apparatus after assembly, or by the intermittent or continuous selective permeation separation of the solution containing the hydrolyzable tannin.

EXAMPLES

The following examples illustrates the membranes of this invention and their use in detail.

Example 1

This example illustrates the increased useful life of a linear aliphatic polyamide resin reverse osmosis membrane containing tannic acid.

Hollow filaments of "Zytel" 43 nylon 66 resin were prepared by using a spinneret of the type described by Burke et al. in U.S. Pat. 3,397,427 in column 2 lines 12ff. The undrawn fibers had an outside diameter of 44.3 microns, an inside diameter of 24.4 microns, and a weight 11 of denier per filament.

Bundles of approximately 15,500 hollow filaments were assembled by winding 216 turns of a filament yarn about two supports 65 inches apart. The bundles were enclosed in loose-fitting sleeves made from polyester fiber and all but a short end of each bundle was immersed in 16.32 normal formic acid at 25° C. for 30 minutes, to treat the hollow filament walls and convert them into reverse osmosis membranes. The filament bundles were then drained and the immersed portion were rinsed with water until free of acid. Thereafter the treated portions were kept wet.

Bundles of treated filaments were installed in two permeators of the type shown in FIG. 2 for evaluation as reverse osmosis membranes. Each permeator contained loops of treated filaments, approximately 41 inches of which were exposed to the feed solution, in a stainless steel tube of nominal one-half inch diameter.

Through the shell of one of these permeators was passed an aqueous solution containing 0.01 weight percent (100 parts per million) tannic acid (National Formulary Edition XII quality). Sufficient solution was passed through the permeator to provide approximately 1.0 weight percent tannic acid based on the dry weight of polyamide in the hollow filaments. Essentially all the tannic acid was absorbed by the membrane under the flow conditions used and the effluent liquid was essentially free of tannic acid by analysis.

The two permeators, one with membranes treated with tannic acid and one with membranes not so treated, were used for the reverse osmosis desalination of an oxygen-containing aqueous feed solution containing 1500 parts per million of mixed calcium, magnesium, and sodium sulfates (133 parts $CaSO_4 \cdot 2H_2O$; 57 parts $MgSO_4$; 57 parts $Na_2SO_4$) under identical conditions. The data in Table I were obtained with a feed pressure of 600 pounds per square inch and a conversion (fraction of feed solution passing through the membrane) of approximately 50% at 30° C.

TABLE I

| Test time | Tannic acid treated | | Not treated | |
|---|---|---|---|---|
| | Permeation rate | Salt passage | Permeation rate | Salt passage |
| Start | 0.20 | 19.5 | 0.25 | 20.0 |
| 72 hours | 0.17 | 17.5 | 0.26 | 22.5 |
| 102 hours | 0.17 | 19.5 | 0.37 | 66 |
| 320 hours | 0.17 | 17.0 | | |

NOTE.—Permeation rate is the gallons of water passed per square foot of membrane per day. Salt passage is the percent of dissolved salts in feed solution passed through the membrane, determined conductiometrically.

Example 2

This example illustrates the increased useful life and the retention of physical strength of a linear aliphatic polyamide resin reverse osmosis membrane containing tannic acid.

Hollow filaments of "Zytel" 43 nylon 66 resin like those used in Example 1 but having an outside diameter of 44.6 microns and in inside diameter of 24.9 microns were assembled into bundles and treated with approximately 16.1 Normal formic acid as described in Example 1 to convert them into reverse osmosis separation membranes.

The physical strength properties of the filaments from one formic acid treated bundle were measured, using conventional techniques and an "Instron" tensile test machine. Doubled single wet filaments were installed in the machine using suitable grips 2.5 centimeters apart and the filaments were stretched at a rate of 5 centimeters per minute (200% strain rate) until they broke. Well known procedures were used to determine from the plotted stress-strain curves the elongation at break and the tenacity at break. Typically, measurements after similar treatments with formic acid give elongations of 150 to 175 percent at break and tenacities of 1.5 to 1.8 grams per denier at break.

Several of the formic acid treated bundles were assembled into permeators as described in Example 1. In reverse osmosis desalination of the mixed sulfate solution described in Example 1 they passed approximately 0.12 gallon per square foot of membrane surface per day with a salt passage of approximately 10% at approximately 33% conversion and a feed pressure of 600 pounds per square inch at 30° C.

During these reverse osmosis tests there was added 0.1 gram of tannic acid to about 5 liters (approximately 0.002 weight percent or 20 parts per million) of the feed solution to some of the permeators, sufficient to provide approximately 0.37 percent tannic acid in the aliphatic polyamide permeation separation membrane. Essentially all the tannic acid was absorbed by the membrane, as shown by analysis of the solutions obtained from the permeators.

These permeators, some with membranes containing tannic acid and other with membranes not containing tannic acid, were used for the reverse osmosis separation of a natural water containing the following concentrations in parts per million of the indicated materials: calcium 30, magnesium 109, sodium 188, potassium 10, iron approximately 0.05, sulfate 850, phosphate 15, bicarbonate 221, chloride 120, fluoride 5, silica 56, total dissolved solids 1610, and oxygen 1 to 4. This water was passed through the permeator shells at a high rate to accelerate membrane deterioration. The mixture passing through the membrane contained a reduced concentration of dissolved salts as shown by a lower electrical conductivity.

Typical permeators were removed from test after various numbers of weeks and the reverse osmosis separation properties of their membranes were determined as described in Example 1. The physical strength properties of the filaments in each permeator were determined as described above. The data in Table II show a significantly longer useful life for the membranes containing tannic acid and a correlation between the change in permeation separation properties and the change in physical strength properties of the membranes.

TABLE II.—EFFECT OF TANNIC ACID TREATMENT

| | Test time, weeks | Not treated | Treated |
|---|---|---|---|
| Reverse osmosis properties: Permeation rate, gal./sq. ft./day | 1 | 0.11 | 0.10 |
| | 2 | 0.11 | 0.09 |
| | 5 | 0.33 | 0.10 |
| | 7 | 0.41 | 0.10 |
| | 12 | 0.55 | 0.29 |
| Salt passage, percent | 1 | 8.9 | 9.1 |
| | 2 | 12 | 8.0 |
| | 5 | 89 | 9.5 |
| | 7 | 91 | 13 |
| | 12 | 100 | 84 |
| Physical strength properties: Elongation at percent | 1 | 188 | 154 |
| | 2 | 64 | 159 |
| | 5 | 34 | 76 |
| | 7 | 37 | 48 |
| | 12 | 0 | 20 |
| Tenacity, grams/denier | 1 | 1.71 | 1.63 |
| | 2 | 0.80 | 1.54 |
| | 5 | 0.42 | 1.02 |
| | 7 | 0.43 | 0.54 |
| | 12 | 0 | 0.26 |

Example 3

This example illustrates the increased useful life of linear aliphatic polyamide resin reverse osmosis membranes upon repeated intermittent exposure to a solution of tannic acid.

Hollow filaments of nylon 66 were made, assembled into two large bundles, and treated with aqueous formic acid to convert them into reverse osmosis separation membranes essentially as described in Example 1. These membrane bundles were assembled into permeators of the configuration of FIG. 1. To these permeators was fed under reverse osmosis conditions an aqueous solution containing tannic acid sufficient to provide 0.3 weight percent tannic acid based on the effective weights of their membranes. Essentially all the tannic acid was absorbed by the membranes as shown by analytical tests.

These permeators were used for the reverse osmosis desalination of the natural water (containing 1610 parts per million of total dissolved solids) described in Example 2. The water passing through the membranes of one of these permeators initially contained about 380 parts per million (23.6% passage) of total dissolved solids. After about 15 weeks the total dissolved solids in the permeated water began to increase, reaching about 510 parts per million (31.7% passage) after 20 weeks and about 700 parts per million (43.5% passage) after 28 weeks.

The water passing through the membranes of the other permeator initially contained about 435 parts per million (27% passage) of total dissolved solids. After 9.5 and 18.5 weeks there was added to the feed water passed through this permeator sufficient tannic acid to provide 0.3 weight percent tannic acid based on the effective weight of the membranes. Essentially all the tannic acid was absorbed by the membranes. After 22 weeks the water passing through the membrane contained about 480 parts per million (29.8% passage) total dissolved solids.

The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Process for separating dissolved and colloidally dispersed materials in aqueous solutions or mixtures other than aqueous tanning extracts, which process comprises subjecting such solution or mixture under pressure to one side of the membrane consisting essentially of a substantially linear aliphatic polyamide resin containing a hydrolyzable tannin in an amount effective to inhibit degradation of the resin.

2. The process of claim 1 wherein the resin is characterized by having the recurring structural unit

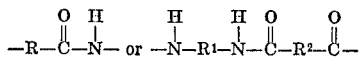

wherein R, $R^1$ and $R^2$ are divalent aliphatic groups of 2–8 carbon atoms.

3. The process of claim 1 wherein the resin has been treated with a protonic acid.

4. The process of claim 3 wherein the protonic acid is formic acid.

5. The process of claim 1 wherein the tannin is tannic acid.

6. The process of claim 2 wherein the hydrolyzable tannin is a gallotannin or an ellagitannin present in an amount between about 0.01 percent to about 5 percent by weight of the membrane.

7. The process of claim 2 wherein the tannin is tannic acid present in an amount of between about 0.01 percent to about 5 percent by weight of the membrane.

8. The process of claim 4 wherein the tannin is tannic acid present in an amount of between about 0.01 percent to about 5 percent by weight of the membrane.

9. The process of claim 2 wherein the membrane is in the form of a hollow filament having an outside diameter of 15–250 microns, a wall thickness of 5–40 microns, and a ratio of the cross-sectional area of the internal bore to the area enclosed by the outside wall is between about 0.12 to about 0.60.

10. The process of claim 9 wherein the hydrolyzable tannin is a gallotannin or an ellagitannin present in an amount between about 0.01 percent to about 5 percent by weight of the membrane.

11. The process of claim 1 wherein the resin is the polyamide of hexamethylenediamine and adipic acid that has been contacted with formic acid, and wherein the tannin is tannic acid present in an amount of between about 0.01 percent to about 5 percent by weight of the membrane.

References Cited

UNITED STATES PATENTS

| 1,057,823 | 4/1913 | Grenet | 210—500 X |
| 3,551,331 | 12/1970 | Cescon et al. | 210—500 X |
| 3,423,491 | 1/1969 | McLain et al. | 210—321 X |
| 3,554,379 | 1/1971 | Pye | 210—321 |
| 3,524,546 | 8/1970 | Hohn et al. | 210—23 |

REUBEN FRIEDMAN, Primary Examiner

R. BARNES, Assistant Examiner

U.S. Cl. X.R.

210—321, 500